(12) United States Patent
Vainsencher

(10) Patent No.: US 8,908,815 B2
(45) Date of Patent: Dec. 9, 2014

(54) DEMAPPER FOR A MULTIPLE-INPUT, MULTIPLE-OUTPUT SYMBOL RECEIVER

(75) Inventor: Leonardo Vainsencher, Tel Aviv (IL)

(73) Assignee: DSP Group Ltd., Herzlia (IL)

( * ) Notice: Subject to any disclaimer, the term of this patent is extended or adjusted under 35 U.S.C. 154(b) by 0 days.

(21) Appl. No.: 13/472,608

(22) Filed: May 16, 2012

(65) Prior Publication Data

US 2013/0308729 A1    Nov. 21, 2013

(51) Int. Cl.
*H04L 27/06* (2006.01)

(52) U.S. Cl.
USPC .......... 375/341; 375/340; 375/262; 375/265; 375/349; 714/795; 714/796

(58) Field of Classification Search
CPC ... H04L 25/067; H04L 27/2601; H04L 27/38; H04L 25/0242; H04L 25/0246; H04L 25/0208; H04L 27/28; H04B 7/0854; H04B 7/0413

USPC .......... 375/340, 341, 262, 265, 349; 714/795, 714/796

See application file for complete search history.

(56) References Cited

U.S. PATENT DOCUMENTS

| | | | |
|---|---|---|---|
| 7,895,503 B2* | 2/2011 | Walton et al. | 714/774 |
| 8,194,801 B1* | 6/2012 | Bitran et al. | 375/341 |
| 2010/0183065 A1* | 7/2010 | Siti et al. | 375/233 |

\* cited by examiner

*Primary Examiner* — Rahel Guarino
(74) *Attorney, Agent, or Firm* — Oren Reches

(57) ABSTRACT

A method, implementable on a multiple-input, multiple-output symbol receiver, includes selecting a hypothesis for a second symbol value $U_2$ from among the set of fixed constellation points, calculating a hypothesis for a first symbol value $U_1$ from the resultant selected $U_2$ value, and generating a first half of counter-hypotheses from interim results of calculating the hypotheses values.

11 Claims, 6 Drawing Sheets

| k | $u_2^k$ | $\tilde{u}_1^k$ | $d^k$ | $u_2^{37}=101\ 010$ | | | |
|---|---|---|---|---|---|---|---|
| | 50 | 52 | 54 | 56 | | | |
| | | | | $c_7:0$ | $c_8:1$ | . . . . . | $c_{12}:1$ |
| 1 | $R_1, I_1$ | $u_1^1$ | $d^1$ | · | · | | · |
| · | · | · | · | · | · | | · |
| · | · | · | · | · | · | | · |
| · | · | · | · | · | · | | · |
| · | · | · | · | · | · | | · |
| · | · | · | · | · | · | | · |
| 37 | $R_{37}, I_{37}$ | $u_1^{37}$ | $d^{37}$ | · | · | | · |
| · | · | · | · | · | · | | · |
| · | · | · | · | · | · | | · |
| · | · | · | · | · | · | | · |
| · | · | · | · | · | · | | · |
| 64 | $R_{64}, I_{64}$ | $u_1^{64}$ | $d^{64}$ | | | | |
| | | | | $d^{24}$ | $d^1$ | | $d^{64}$ |

DEMAPPER FOR A MULTIPLE-INPUT, MULTIPLE-OUTPUT SYMBOL RECEIVER

FIELD OF THE INVENTION

The present invention relates to communication systems generally and to multiple-input, multiple-output communication systems in particular.

BACKGROUND OF THE INVENTION

In most transmission systems, in order to transmit at a high bit rate, symbols representing multiple bits are transmitted. The symbols are defined in the complex plane and are defined by a given constellation. The more bits that each symbol represents, the more points in the constellation. The complex symbols are transmitted with two frequency-domain signals, one representing the Real part and one representing the Imaginary part, known as the "in-phase" and "quadrature" signals.

FIG. 1, to which reference is now made, shows an exemplary 64-point constellation, for the QAM (quadrature amplitude modulation) method. Each point, which represents a symbol value, is a complex number having a Real and Imaginary parts. Thus, the point labeled 40 has a complex value of (5,3). It also has a complex bit pattern associated therewith, of 101 111, where 101 is the bit pattern associated with the Real part and 111 is the bit pattern associated with the Imaginary part of the symbol. Thus, there are 6 bits associated with each symbol.

FIG. 2, to which reference is now made, illustrates the transmission from one transmitting antenna, labeled 10, to another, receiving, antenna, labeled 12. Between the two there is a "channel" H, which is the path in the air between transmitting antenna 10 and receiving antenna 12, which may be obstructed, such as by trees, hills, buildings, etc. Transmitting antenna 10 transmits a symbol, here labeled u, and receiving antenna 12 receives a signal, here labeled y, which is a corrupted version of symbol u, by the channel H and by noise n, as follows:

$$Y = hu + n \qquad \text{Equation 1}$$

where the h defines how the channel affects transmission and n is random noise.

Equation 1 defines how the channel affects the transmission of a symbol. Point 5 in FIG. 1 shows a received symbol y. Note that point 5, while close to two points 7 and 9 of the constellation, doesn't sit on either of them. Thus, it is the job of the receiver to determine which symbol point 7 or 9 (or any other symbol) was originally transmitted.

A system where transmission of two or more symbols at the same time from two or more transmitter antennas to two or more receiver antennas takes place is known as a MIMO (multiple-input, multiple-output) communication system. The transmitted symbols are not related to each other and the paths, though similar, are not exactly the same. This is shown in FIG. 3, to which reference is now made, for the case of two transmitter antennas and two receiver antennas. Symbols $u_1$ and $u_2$ are transmitted from transmitting antennas 10a and 10b, respectively, and signals $y_1$ and $y_2$ are received at receiving antennas 12a and 12b, respectively. Both receiving antennas 12a and 12b receive versions of the transmitted symbols $u_1$ and $u_2$, which are transformed by the channel, where the channel for the MIMO case is a matrix H. and are affected by noise $n_1$ and $n_2$, respectively.

FIG. 4, to which reference is now made, shows exemplary received signals $y_1$ and $y_2$ in their constellations. Signal $y_1$ is in the lower right quadrant while signal $y_2$ is in the upper right quadrant. The goal is to decode signals $y_1$ and $y_2$ in order to determine transmitted symbols $u_1$ and $u_2$, which normally represent a coded version of original data bits including redundancy. The decoding process can be divided in two steps where, initially, the received signals y1 and y2 are converted to "soft" bit information such as Log Likelihood Ratios for each coded bit. Afterwards, the data bits are extracted from the soft bit information by a Maximum Likelihood Sequence Estimator, such as a soft-input Viterbi Decoder.

SUMMARY OF THE PRESENT INVENTION

There is provided, in accordance with a preferred embodiment of the present invention, a demapper for a multiple-input, multiple-output symbol receiver. The demapper includes a hypothesis determiner and a first half counter-hypothesis determiner. The hypothesis determiner determines hypotheses values for each of a multiplicity of received symbols. The first half counter-hypotheses determiner reuses interim results of the hypothesis determiner to generate a first half of the counter-hypotheses.

Further, in accordance with a preferred embodiment of the present invention, the demapper includes a the second half counter-hypotheses determiner which receives a portion of the interim results and provides them to a table lookup to generate a second half of the set of the counter-hypotheses.

Moreover, in accordance with a preferred embodiment of the present invention, the hypothesis determiner includes a QR decomposer, a normalizer, a candidate hypothesis generator, a normalized error calculator and a hypothesis generator. The QR decomposer generates at least an R matrix from an input channel estimate matrix H. The normalizer normalizes input signals and elements of the R matrix. The candidate hypothesis generator operates on the output of the normalizer to generate a plurality of constrained candidate hypothesis values for one of the received symbols and resultant unconstrained hypothesis values for a second one of the received symbols. The normalized error calculator operates with minimal multiplications and generates an error magnitude for each of the plurality of constrained candidate hypotheses and their resultant unconstrained hypothesis values. The hypothesis generator reviews the error magnitudes and selects the constrained hypothesis and resultant unconstrained hypothesis corresponding to the smallest error magnitude.

Further, in accordance with a preferred embodiment of the present invention, the first half counter-hypotheses determiner includes a multiplicity of counter-hypothesis generators, one per bit of the selected hypothesis, each to review a set of the error magnitude associated with candidate counter-hypotheses and to select the counter-hypothesis corresponding to the smallest error magnitude in the set of error magnitudes.

Still further, in accordance with a preferred embodiment of the present invention, the normalized error calculator includes a $d_2$ error magnitude calculator, a $d_1$ error magnitude calculator and a total error magnitude calculator. The $d_2$ error magnitude calculator evaluates the error $\bar{E}_2^{(k)} = \bar{X}_2 - \bar{r}_2 U_2^{(k)}$ and its corresponding $L_1$ norm. The $d_1$ error magnitude calculator evaluates $\tilde{U}_1^{(k)} = \bar{X}_1 - \bar{R}_{12} U_2^{(k)}$, to find the closest constellation point $U_1^{(k)}$ to an unconstrained solution $\tilde{U}_1^{(k)}$ and determines the error $\bar{E}_1^{(k)}$ therebetween and its corresponding $L_1$ norm. The total error magnitude calculator determines the total error magnitude from the output of $d_2$ error magnitude calculator and $d_1$ error magnitude calculator.

Additionally, in accordance with a preferred embodiment of the present invention, the $d_1$ error magnitude calculator and the $d_2$ error magnitude calculator include $L_1$ norm calculators.

Furthermore, in accordance with a preferred embodiment of the present invention, the demapper has a fixed throughput defined by a fixed number of cycles to generate the output.

Moreover, in accordance with a preferred embodiment of the present invention, the normalized error calculator includes a multiplicity of processing branches, wherein the number of processing branches scales with a complexity of the constellation type related to the symbols.

Still further, in accordance with a preferred embodiment of the present invention, the demapper provides the hypotheses and counter-hypotheses values to an LLR determiner. The LLR determiner utilizes the interim results of the hypothesis and first half counter-hypotheses determiner and interim results of the second half counter-hypothesis determiner to generate a log-likelihood ratio $L_b$.

There is also provided, in accordance with a preferred embodiment of the present invention, a method, implementable on a multiple-input, multiple-output symbol receiver. The method includes selecting a hypothesis for a second symbol value $U_2$ from among the set of fixed constellation points, calculating a hypothesis for a first symbol value $U_1$ from the resultant selected $U_2$ value and generating a first half of counter-hypotheses from interim results of calculating the hypotheses values.

Further, in accordance with a preferred embodiment of the present invention, the method includes providing a portion of the interim results to a table lookup to generate a second half of the set of the counter-hypotheses.

Moreover, in accordance with a preferred embodiment of the present invention, the method also includes, prior to the calculating, normalizing the following equations by $r_1$ thereby to enable the remaining operations to operate with minimal multiplications:

$$E_2 = X_2 - r_2 U_2$$

$$E_1 = X_1 - r_1 U_1 - R_{12} U_2$$

where the R elements are from a right triangular matrix R generated by QR decomposition from an input channel estimate matrix H, $U_1$ and $U_2$ are the transmitted symbols to be demapped and $X_1$ and $X_2$ are the received signals.

Further, in accordance with a preferred embodiment of the present invention, the calculating includes calculating errors and determining the size of the errors is performed with an $L_1$ norm without significantly affecting the quality of the demapping.

Additionally, in accordance with a preferred embodiment of the present invention, the method also includes determining a log-likelihood ratio $L_b$ from the interim results of calculating the hypotheses values and from interim results of the table lookup operation.

BRIEF DESCRIPTION OF THE DRAWINGS AND APPENDICES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
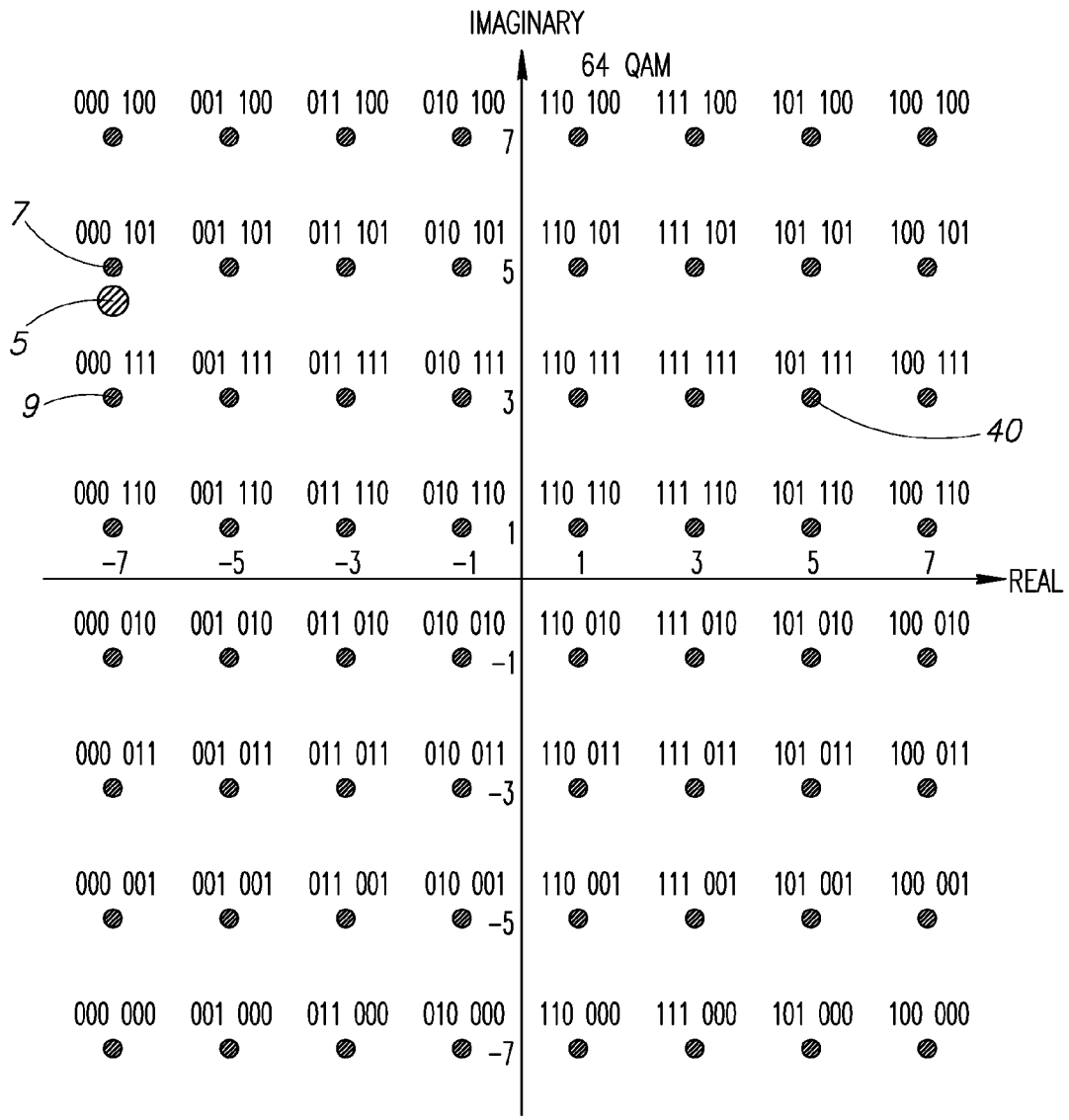
FIG. 1 is a schematic illustration of an exemplary 64-point constellation, for the QAM (quadrature amplitude modulation) method.
Figure 2:
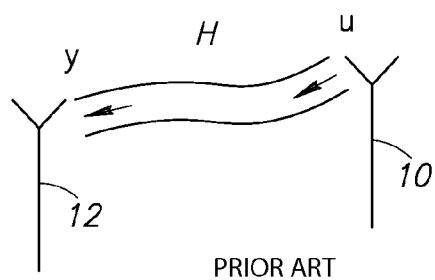
FIG. 2 is a schematic illustration of the transmission from one transmitting antenna to a receiving antenna.
Figure 3:
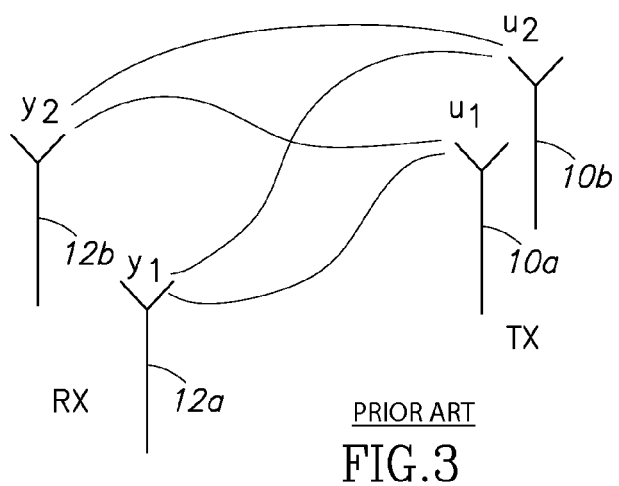
FIG. 3 is a schematic illustration of the transmission from two transmitting antennas to two receiving antennas.
Figure 4:
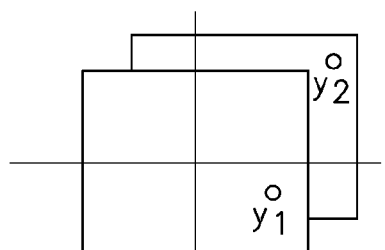
FIG. 4 is a schematic illustration of a constellation with two received symbols.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the processing for a MIMO (multiple-input, multiple-output) demapper may be significantly reduced.

Figure 5:
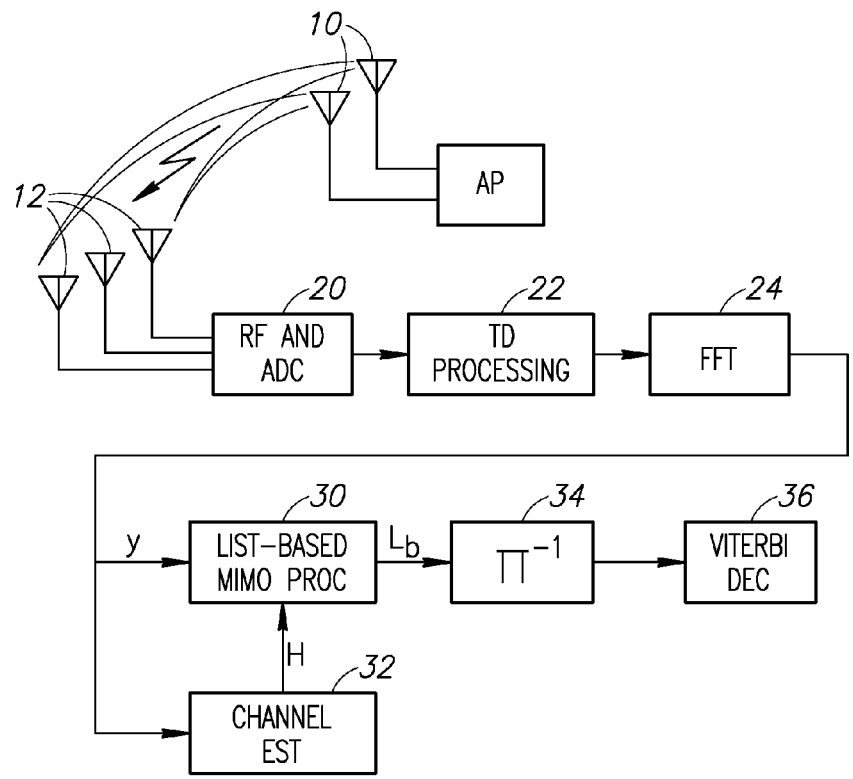
FIG. 5 is a block diagram illustration of a MIMO (multiple-input, multiple-output) system, constructed and operative in accordance with a preferred embodiment of the present invention.

Reference is now made to FIG. 5, which illustrates the main elements of a MIMO system. On the transmission side, an access point (AP) may provide its data to be transmitted through multiple transmitting antennas 10, where FIG. 5 shows 2 antennas 10. These are received by N receiving antennas 12, where, in FIG. 5, three receiving antennas 12 are shown. The output of receiving antennas 12 may be processed, such as by a radio frequency (RF) unit 20 to receive the transmission and to convert it from an analog to a digital signal (ADC), a time domain (TD) processor 22 to process the digital, time domain signal and a fast Fourier transform (FFT) unit 24 to convert the time domain signal to a frequency based signal, which is the incoming signal y. Units 20-24 may be standard units. The incoming y signal may be a vector of length N, where N is the number of receiving antennas 12.

The incoming signal y may be provided to a MIMO processor which, in accordance with a preferred embodiment of the present invention, may be a list based, MIMO processor 30, and to a channel estimator 32. Channel estimator 32 may be a standard channel estimator which may provide the matrix H for the current channel, where H is of size N×M, where M is the number of transmission antennas 10.

The output of MIMO processor 30 may be provided to a deinterleaver 34 which provides its output to a Viterbi decoder 36 for a final determination of the transmitted data bits.

The output of MIMO processor 30 may be a vector Lb which may provide "soft" information corresponding to the values of the symbols u represented by the incoming signal y. Like y, Lb may be a vector, but Lb may be a vector of length M*J, where J is the number of bits in a symbol. In other words, u represents the M transmitted symbols, each of which has J bits.

In accordance with a preferred embodiment of the present invention, MIMO processor 30 may provide "soft decisions" for each bit, thus providing unit 34 and Viterbi decoder 36 with some indication of the quality of the demapping.

MIMO processor 30 may calculate a log-likelihood ratio $L_b$ for each bit position b in symbol vector u. Using a "Log Max approximation", a standard approximation, the ratio $L_b$ may be defined as:

$$L_b = \frac{1}{\sigma^2}(2\hat{u}^{[b]} - 1)(\|y - H\hat{c}_b\|^2 - \|y - H\hat{u}\|^2) \quad \text{Equation 2}$$

where σ may be the standard deviation of the noise, û may be a hypothesis for the values of u, $\hat{c}_b$ may be a corresponding counter hypothesis for the bit position b, defined in more detail herein below and, $\hat{u}^{[b]}$ may be the bit value {0 or 1} at bit position b of the bit pattern associated with û.

Equation 2 may be further simplified by performing a standard decomposition, defined by:

$$H = QR \quad \text{Equation 3}$$

Where Q is the unitary matrix, which, when multiplied by its conjugate-transpose Q* creates the identity matrix I (mathematically: Q×Q*=I), and R is an upper-triangular matrix.

The resultant simplified version of equation 2 is:

$$L_b = \frac{1}{\sigma^2}(2\hat{u}^{[b]} - 1)(\|x - R\hat{c}_b\|^2 - \|x - R\hat{u}\|^2) \quad \text{Equation 4}$$

where x is a form of y defined by Q*×y.

It will be appreciated that equation 4 is simpler than equation 2 because H is a complex matrix generally having no zero elements whereas R is an upper triangular matrix of complex elements.

Hypothesis û may be defined by:

$$\hat{u} = \arg \min_{u \in \mathbb{Q}} \|x - Ru\|^2 \quad \text{Equation 5}$$

where argmin is the argument which minimizes the "$L_2$ norm", a standard norm defined by the double lines, and $\mathbb{Q}$ is the space of the constellation (i.e. it covers all possible symbol values within the constellation).

The counter hypothesis at bit position b, $\hat{c}_b$, may be defined as:

$$\hat{c}_b = \arg \min_{c \in \mathbb{Q}^{[b]}(\hat{u})} \|x - Rc\|^2 \quad \text{Equation 6}$$

Where $\mathbb{Q}^{[b]}(\hat{u})$ is the subset of the constellation space $\mathbb{Q}$ whose elements have associated bit patterns with a bit value at position b opposite to the corresponding bit value at that bit position associated with the hypothesis û. To determine the log-likelihood ratio $L_b$, therefore, one has to evaluate equations 5, 6 and 4, in that order. There are 64 possible symbols in the QAM constellation example and two symbols which have been transmitted. This is a significant number of possibilities! Moreover, each equation requires a significant amount of matrix calculations, which requires a significant amount of multiplications. Thus, this calculation is difficult to perform for the large constellations such as the one used here as an example.

Figure 6:
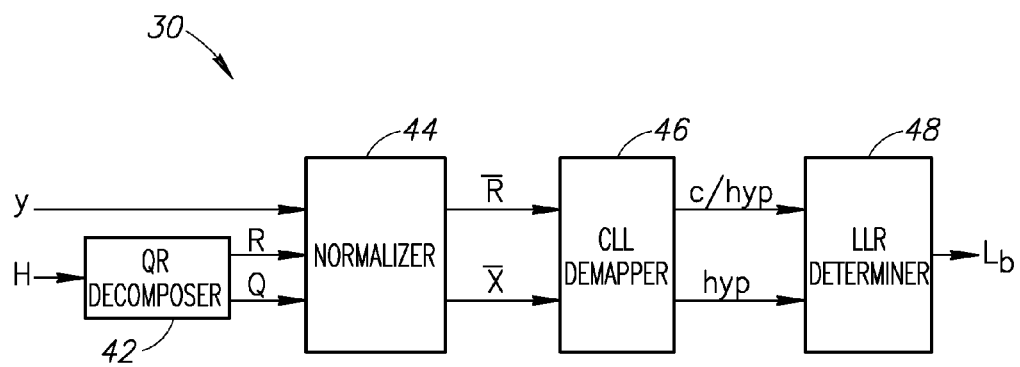
FIG. 6 is a block diagram illustration of the elements of the MIMO processor of FIG. 5, constructed and operative in accordance with a preferred embodiment of the present invention.

Applicant has invented a relatively efficient way to evaluate equations 6 and 5 in a manner which minimizes the amount of multiplications and other necessary operations. Reference is now made to FIG. 6, which illustrates the elements of MIMO processor 30. Processor 30 may comprise a QR decomposer 42, a normalizer 44, a complex list-based lattice (CLL) demapper 46 and log-likelihood ratio (LLR) determiner 48. Together, the elements solve equations 4, 5 and 6.

Initially, processor 30 may handle the error term:

$$e = (E_1 E_2)^T = x - Ru$$

Since R is an upper triangular matrix, its elements are:

$$R = \begin{pmatrix} r_1 & R_{12} \\ 0 & r_2 \end{pmatrix}$$

where $r_1$ and $r_2$ are real variables and $R_{12}$ is a complex variable. The error term may be rewritten as two error terms, as follows:

$$E_2 = X_2 - r_2 U_2 \quad \text{Equation 7}$$

$$E_1 = X_1 - r_1 U_1 - R_{12} U_2 \quad \text{Equation 8}$$

Normalizing equations 7 and 8 by $r_1$ reduces the implementation costs of equation 8, which must be computed many times. Thus, QR decomposer 42 may evaluate equation 3 and may produce matrices Q and R and normalizer 44 may normalize the non-symbol terms of equations 7 and 8, to generate:

$$\overline{E}_2 = \overline{X}_2 \overline{r}_2 U_2 \quad \text{Equation 7a}$$

$$\overline{E}_1 = \overline{X}_1 - U_1 - \overline{R}_{12} U_2 \quad \text{Equation 8a}$$

Equation 8a may be rewritten as two equations an equation for an unconstrained solution $\tilde{U}_1$ and an equation for the error in constraining $\tilde{U}_1$ to a valid constellation point $U_1$. Thus:

$$\tilde{U}_1^{(k)} = \overline{X}_1 - \overline{R}_{12} U_2^{(k)} \quad \text{Equation 9}$$

$$\overline{E}_1^{(k)} = \tilde{U}_1^{(k)} - U_1^{(k)} \quad \text{Equation 10}$$

Equations 7a, 9 and 10 need to be evaluated for all possible combinations of $U_1$ and $U_2$. This is normally a difficult operation given that, in a constellation of $|\mathbb{Q}|$ symbols, there are $|\mathbb{Q}|^2$ combinations of $U_1$ and $U_2$.

If you fix the value of $U_2$ to be one of the values in the constellation, equation 9 will generate an associated unconstrained solution $\tilde{U}_1$ from which $U_1$ may be derived as the constellation point nearest to the unconstrained solution $\tilde{U}_1$.

Figures 7, 8:
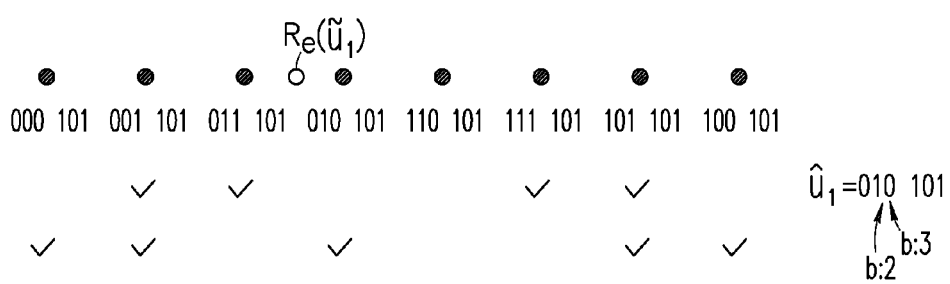
FIGS. 7 and 8 are illustrations of the calculations performed by a demapper of FIG. 6.

Reference is now made to FIG. 7, which illustrates this. Column 50 lists the $|\mathbb{Q}|$ possible constellation points, denoted by k (64 points in the QAM constellation example). Column 52 lists the symbol value of $U_2^{(k)}$ for each point k. Rather than giving values, the table lists these as (Ri,Ii). These are the possible values of $U_2$. Using equation 9, column 54 lists the resultant values of $\tilde{U}_1^{(k)}$ for each value of $U_2^{(k)}$. For clarity, the table lists only three resultant values, for k=1, 37 and 64.

It will be appreciated that $U_1^{(k)}$ may be set to the symbol value closest to the generated value of approximation $\tilde{U}_1^{(k)}$.

Equation 10 provides the error term for each of the 64 values of $U_1^{(k)}$ and equation 7a provides the error term for $E_2$, for each of the 64 values of $U_2^{(k)}$.

A error magnitude $d^{(k)}$ may be generated for each value of k from equations 10 and 8a, as follows:

$$d_2^{(k)} = |\text{Re}(\overline{E}_2^{(k)})| + |\text{Im}(\overline{E}_2^{(k)})| \quad \text{Equation 11a}$$

$$d_1^{(k)} = |\text{Re}(\overline{E}_1^{(k)})| + |\text{Im}(\overline{E}_1^{(k)})| \quad \text{Equation 11b}$$

$$d^{(k)} = d_2^{(k)} + d_1^{(k)} \quad \text{Equation 11c}$$

Where Re( ) takes the real part and Im( ) takes the imaginary part of a complex number. It will be appreciated that equations 11a and 11b determine the error magnitude using an $L_1$ norm, which is a simpler calculation as it uses only standard absolute values and does not have any multiplication in it.

The table of FIG. 7 lists $d^{(k)}$, in column 56, for each of the 64 values of the table. In accordance with a preferred embodiment of the present invention, demapper 46 may search column 56 to find the row with the smallest error magnitude d. For example, in FIG. 7, row 37 is circled to indicate that $d^{(37)}$ has the smallest value. Thus, in this example, the $37^{th}$ constellation pair $(U_1^{(37)}, U_2^{(37)})$ provides us with the hypothesis, i.e. û. Mathematically, the search in column 56 may be written as:

$$k_{ML} = \arg\min_k \{d^{(k)}\} \quad \text{Equation 12}$$

i.e. the constellation point of the solution is the one which has the smallest error magnitude d. It should be noted that, aside from the use of the $L_1$ norm instead of the $L_2$ norm, equation 12 leads to estimates which are essentially ML (maximum likelihood) estimates for the transmitted symbols u because of the log-max approximation in equation 2. It will be appreciated that the estimates of equation 12 are only negligibly different from the true ML estimates. The resultant hypothesis is written mathematically as:

$$\hat{u} = (\hat{U}_1, \hat{U}_2)^T = (U_1^{(k_{ML})}, U_2^{(k_{ML})})^T \quad \text{Equation 13}$$

It will be appreciated that, with a minimal amount of multiplications and only 64 combinations, demapper 46 may produce the hypothesis û (i.e. Equation 5). What remains is to determine the counter-hypotheses $\hat{c}_b$.

Applicant has realized that, since the $U_2$ value was selected from among the possible values of the constellation, the $U_2$ value is a "constrained" solution, constrained to be a proper constellation point. Thus, its counter-hypotheses $\hat{c}_b$ may be directly determined from the error magnitude calculations of equation 11c. This is not true for the $U_1$ values, which are calculated from the $U_2$ constellation points and do not, in general, cover all the constellation points.

It will be appreciated that, since the $U_2$ value is a proper constellation point, accordingly, half of the counter-hypothesis determinations (i.e. those related to $U_2$) do not require additional calculations and they are thus determined nearly for 'free', as follows:

For each bit b in the selected $\hat{U}_2$ (for example, there are 6 bits in a 64 QAM constellation point), demapper 46 may determine which of the constellation points have the opposite value (i.e. they have a 1 value where the bit in $\hat{U}_2$ has a 0 value or a 0 value where the bit in $\hat{U}_2$ has a 1 value). Thus, if $U_2^{(37)}$ ($k_{ML}$=37) is (101,000), then, for bit 1, demapper 46 may search for all constellation points whose first bit has a value of 0. There are 32 of these points. FIG. 8 denotes those constellation points with the desired counter-hypothesis bit value with a check and those with the undesired bit value with a dash.

In effect, demapper 46 may mask the constellation points that have the undesired bit value and then may search through the remaining unmasked error magnitude $d^{(k)}$ values in column 56 for the constellation point with the smallest error magnitude. This may produce counter-hypothesis $\hat{c}_b$ for bit b. In FIG. 7, $d^{(24)}$ is shown to have the smallest error magnitude and thus, constellation pair 24, $U_2^{(24)}$ and the corresponding $U_1^{(24)}$, is the counter-hypothesis for bit 1 of hypothesis $U_2^{(37)}$, where bit 1 of hypothesis $U_2^{(37)}$ is bit 7 of the overall hypothesis vector. Note that, in the example of FIG. 7, $d^{(1)}$ is listed as the smallest error magnitude for bit 8, and $d^{(64)}$ is listed as the smallest error magnitude for bit 12.

Mathematically, the process described hereinabove is defined as:

$$l_{ML}^{(\beta)} = \arg\min_{l \in \delta_\beta} \{d^{(l)}\}$$

$$\delta_\beta = \{l : U_2^{(l)[\beta]} \neq \hat{U}_2^{[\beta]}\}, \beta = 1, \ldots, 6$$

$$\hat{c}_{\beta+6} = (U_1^{(l_{ML}^{(\beta)})}, U_2^{(l_{ML}^{(\beta)})})^T \quad \text{Equation 14}$$

where l is one constellation point, $l_{ML}^{(\beta)}$ is the selected constellation point (i.e. the point with the smallest error magnitude) and $\delta_\beta$ is the mask.

What remains is to determine the counter-hypotheses $\hat{c}_b$ for bits associated with hypothesis $\hat{U}_1$. Recall that $\hat{U}_1$ is an unconstrained solution (i.e it is a calculated value rather than a fixed, integer constellation value). Thus, it isn't clear what the counter-hypothesis is, as the values of the bits are not exactly 0 or 1. Thus, a search must be made for the counter-hypothesis for each bit.

Applicant has realized that, for the 64 point QAM constellation, there are only four possibilities for each counter-hypothesis for $U_1$. This is because $U_1$ has six bits, only one of which must be changed for the counter-hypothesis. If the changed bit corresponds to the real part of the symbol, the imaginary part is kept unchanged. Likewise, if the changed bit corresponds to the imaginary part of the symbol, the real part is kept unchanged. This leaves two bits, both from either the real part or the imaginary part that can be varied. Consequently, there are only four candidate constellation points. Thus, as shown in FIG. 8 to which reference is now briefly made, if $\hat{U}_1$ is (010,101), if the bit of interest is bit 3, which has a 0 value, only the constellation points (001,101), (011,101), (111,101) and (101,101) have bit 3 with a 1 value, while keeping bits 4, 5 and 6 unchanged. If the bit of interest is bit 2, then the constellation points of interest are (000,101), (001,101), (101,101) and (100,101).

Note that in the example of FIG. 8, the four constellation points are all in the same row. That is because bits 1-3 are associated with the Real axis. The points would be in the same column if the bits of interest were associated with the Imaginary axis. In accordance with the present invention, constellation points are searched along one axis; otherwise, the total error magnitude would necessarily increase and not reach a global minimum.

Thus, for each of the four possible counter-hypothesis constellation points, the error magnitude may be determined and the smallest value selected. This process is repeated for each of 64 unconstrained solutions $\hat{U}_1^{(m)}$. Each corresponding constrained value $U_1^{(m)}$ is converted to a candidate value $U_1^{(m,\beta)}$, where the latter is a proper counter-hypothesis candidate as described above, for each bit position $\beta$ in $\hat{U}_1$. For each candidate value $U_1^{(m,\beta)}$, a corresponding partial error magnitude $d_1^{(m,\beta)}$ is computed according to equations 10 and 11b. This partial error magnitude is used to compute the total error magnitude $d^{(m,\beta)} = d_2 + d_1^{(m,\beta)}$. The resulting set $d^{(m,\beta)}$ of 64 error magnitudes may be searched to determine the smallest value. The pair $\{U_2^{(m)}, U_1^{(m,\beta)}\}$ corresponding to the smallest $d^{(m,\beta)}$ is selected as the essentially ML estimate of $c_\beta$ for bit $\beta$.

Note that this process is repeated for each bit position $\beta$ in $\hat{U}_1$. The arithmetic cost of each operation is essentially a small number of additions (no multiplications are involved due to the pre-normalization in equation 8a) per constellation point (64 possibilities) and per bit position (6 possibilities).

Applicant has realized that the determination of $U_1^{(m,\beta)}$ per constellation point m and per bit position $\beta$ is a function of the value of $\hat{U}_1$ and the position of the hypothesis candidate $U_1^{(m)}$ relative to the corresponding unconstrained solution $\tilde{U}_1^{(m)}$ (i.e. is the real/imaginary part of $\tilde{U}_1^{(m)}$ to the left/below or right/above of the closest constellation point $U_1^{(m)}$?) and may be implemented as a table lookup (TLU) function. For 64 point QAM, the lookup table has $2 \times 8 \times 2 \times 3 = 96$ entries. Appendix A provides exemplary lookup tables for various QAM constellations. The table lists the bit position $\beta$, the value of hypothesis bit $\beta$ ($\hat{U}_1^{[\beta]}$), the sign of the error term $\overline{E}_1^{(m)}$, the hypothesis candidate $U_1^{(m)}$, and the resultant counter hypothesis candidate $U_1^{(m,\beta)}$.

Given the output of the table lookup function, the counter-hypothesis may be calculated, as follows:

$$\text{Re}(U_1^{(m,\beta)}) = \text{TLU}(\hat{U}_1^{[\beta]}, \text{Re}(U_1^{(m)}), \text{sign}(\text{Re}(\overline{E}_1^{(m)})), \beta) \quad \text{Equation 15A}$$

$$\text{Im}(U_1^{(m,\beta)}) = \text{TLU}(\hat{U}_1^{[\beta]}, \text{Im}(U_1^{(m)}), \text{sign}(\text{Im}(\overline{E}_1^{(m)})), \beta) \quad \text{Equation 15B}$$

$$\tilde{E}_1^{(m,\beta)} = \tilde{U}_1^{(m)} - U_1^{(m,\beta)} \quad \text{Equation 16}$$

$$d_1^{(m,\beta)} = |\text{Re}(\tilde{E}_1^{(m,\beta)})| + |\text{Im}(\tilde{E}_1^{(m,\beta)})| \quad \text{Equation 17}$$

$$d^{(m,\beta)} = d_2^{(m)} + d_1^{(m,\beta)} \quad \text{Equation 18}$$

$$m_{ML}^{(\beta)} = \arg\min_m \{d^{(m,\beta)}\} \quad \text{Equation 19}$$

$$\hat{c}_\beta = (U_1^{(m_{ML}^{(\beta)}, \beta)}, U_2^{(m_{ML}^{(\beta)})})^T \quad \text{Equation 20}$$

where, $\beta$ is the bit number of interest (i.e. 1-6), and m is the constellation point index of interest. Note that the values of $\hat{U}_1$, $U_1^{(m)}$, $\overline{E}_1^{(m)}$ and $d_2^{(m)}$ known from the previous calculations.

Figure 9:
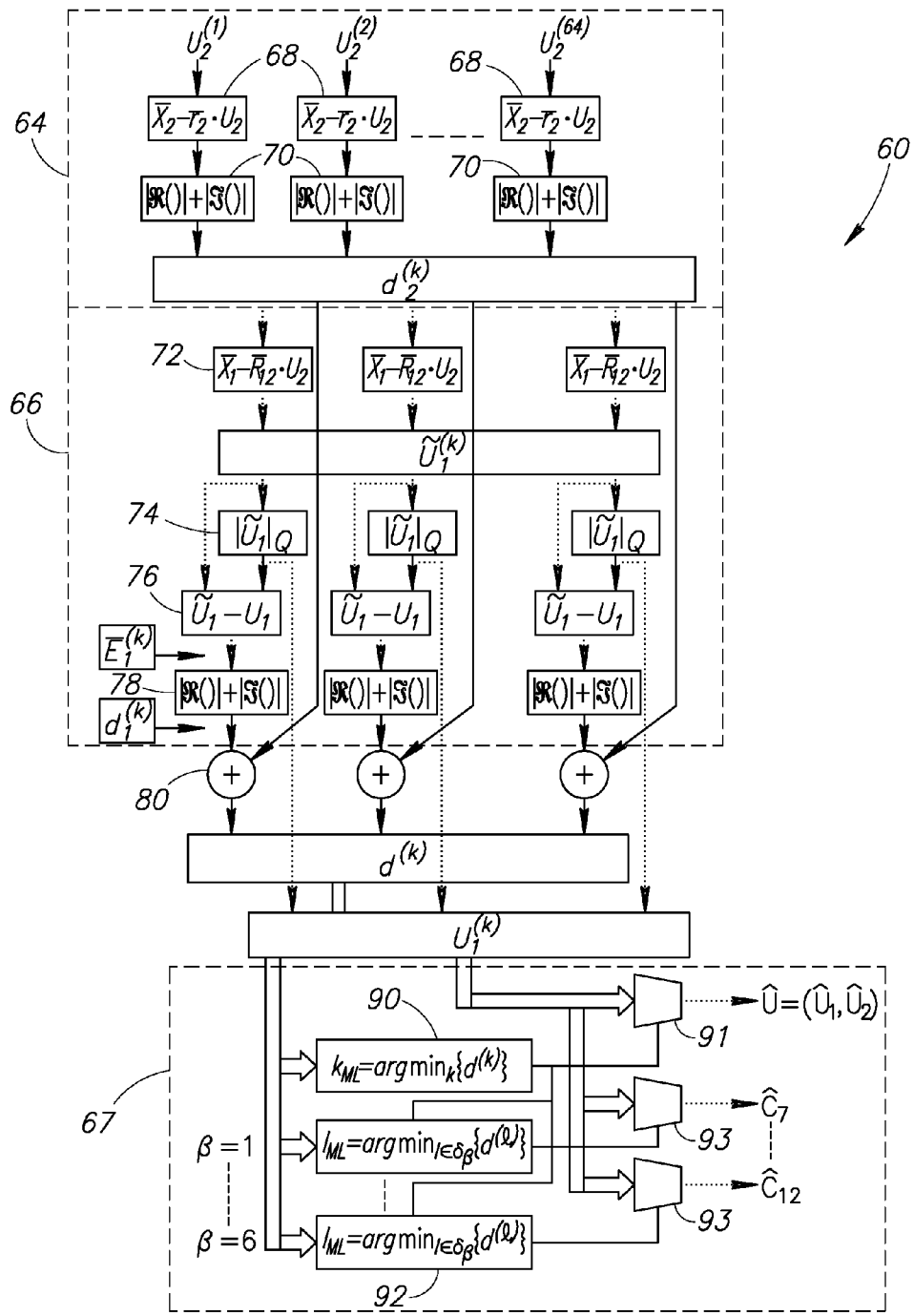
FIGS. 9 and 10 are block diagram illustrations of an exemplary hardware implementation of the demapper of FIG. 6; and Appendix A provides tables useful for a table lookup element of FIG. 10 for multiple types of constellations.
Figure 10:
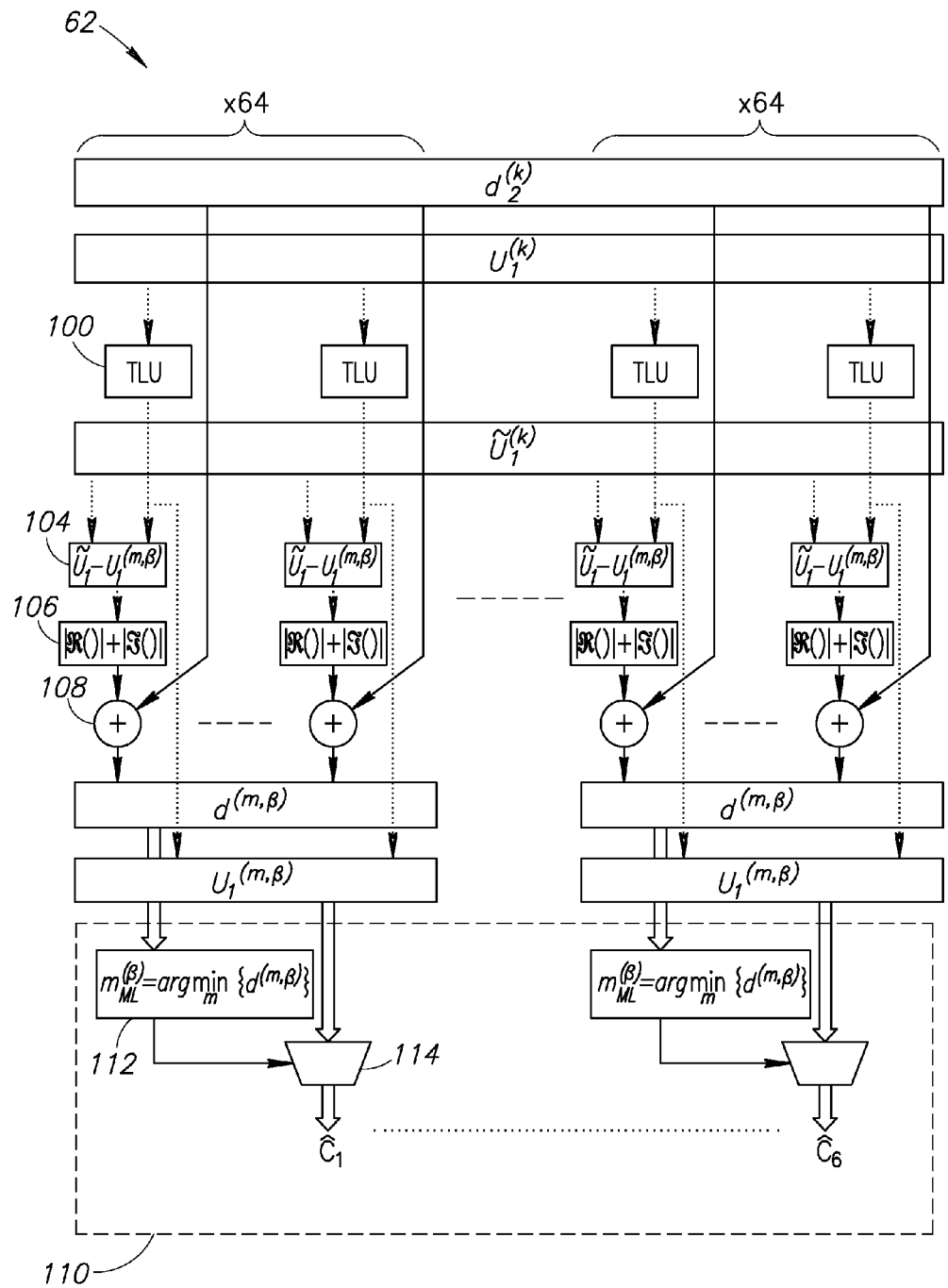

Reference is now made to FIGS. 9 and 10, which illustrate an exemplary hardware implementation for demapper 46. Demapper 46 may comprise a hypothesis and top-half counter-hypothesis determiner (HCHD) 60 and a bottom-half counter-hypothesis determiner (BCHD) 62.

HCHD 60 may comprise a $d_2$ error magnitude calculator 64 and a $d_1$ error magnitude calculator 66. $D_2$ error magnitude calculator 64 may comprise a multiplicity of elements 68 which may receive the normalized values of $r_2$ and of received symbol $X_2$ and may evaluate equation 7a ($\overline{E}_2 = \overline{X}_2 - \overline{r}_2 U_2$) for each constellation point $U_2$. Equation 7a is a complex equation but may be evaluated as two real equations as follows:

$$\text{Re}\overline{E}_2 = \text{Re}\overline{X}_2 - \overline{r}_2 \text{Re} U_2 \quad \text{Equation 7a(1)}$$

$$\text{Im}\overline{E}_2 = \text{Im}\overline{X}_2 - \overline{r}_2 \text{Im} U_2 \quad \text{Equation 7a(2)}$$

Thus, elements 68 may separately evaluate equations 7a(1) and 7a(2).

Moreover, since quantities Re $U_2$ and Im $U_2$ are essentially 3-bit operands (i.e. 3 bit values), elements 68 may be efficiently implemented with a few adders rather than as multipliers. Calculator 64 may also comprise a multiplicity of simple absolute value adders 70 which may determine the error magnitude $d_2$ (from equation 11a) for each constellation point $U_2$.

$D_1$ calculator 66 may determine the error magnitude $d_1$ and may comprise complex multipliers 72 to evaluate equation 9 ($\tilde{U}_1^{(k)} = \overline{X}_1 - \overline{R}_{12} U_2^{(k)}$) and to thus determine the unconstrained solution $\tilde{U}_1^{(k)}$. $d_1$ calculator 66 may also comprise a multiplicity of nearest constellation point determiners 74 which may find the closest constellation point to each unconstrained solution $\tilde{U}_1^{(k)}$, thereby to determine the $U_1$ hypothesis. $d_1$ calculator 66 may comprise a multiplicity of subtractors 76 to subtract the $U_1$ values from the unconstrained solution $\tilde{U}_1^{(k)}$, thereby evaluating equation 10. Their output may be provided to a multiplicity of simple absolute value adders 78 to determine the partial error magnitude $d_1$ for each constellation point k, thereby evaluating equation 11b.

The output of both calculators 64 and 66 may be provided to simple real adders 80 to determine the total error magnitude $d^{(k)}$ for each constellation point (i.e. evaluating equation 11c).

HCHD 60 may additionally comprise a hypothesis generator 67, comprising a minimum evaluator 90 to determine, from error magnitudes $d^{(k)}$, a hypothesis candidate $\{U_2^{(k)}, U_1^{(k)}\}$, an associated selector 91, and a set of minimum evaluators 92 for the top counter hypotheses, each of which reviews a different subset of the error magnitudes $d^{(k)}$, each with their associated selector 93. Hypothesis minimum evaluator 90 may evaluate equation 12, over the entire set of error magnitudes, thereby to generate the hypothesis value of $U_1$ for its corresponding $U_2$.

The selected hypothesis values have associated bit patterns, and each counter hypothesis minimum evaluator 92 may be associated with a particular bit b. Each evaluator 92 may select the error magnitude $d^{(l)}$ with the minimum value having the required counter hypothesis value for its associated bit b. This is used to select the counter-hypothesis values for $U_2$—an evaluation of equation 14. Applicant has realized that by working with error magnitude subsets, no further operations are required to compute the counter-hypotheses for $U_2$, besides finding the minimum among error magnitudes in each subset.

It will be appreciated that, except for the multipliers 68 and 72, the remaining elements of HCHD 60 are simple elements.

BCHD 62 may comprise table lookup elements 100, one per bit of the counter-hypothesis, a few simple subtractors 104 and a multiplicity of absolute value adders 106. Each table lookup element 100 may take its hypothesis values for $U_1$ and difference values $E_1$ from HCHD 60 and may generate the value for $U_1^{(m,\beta)}$ and the selected constellation point m, according to equation 15. Each subtractor 104 may evaluate equation 16, subtracting the selected constellation point $U_1^{(m,\beta)}$ value from the previously determined unconstrained solution $\tilde{U}_1^{(m)}$ value.

Each absolute value adder 106 may evaluate equation 17 by determining the error magnitude $d_1^{(m,\beta)}$ for the selected constellation point m and bit position $\beta$ of $U_1$, where the error magnitude is calculated using absolute values (i.e. the $L_1$ norm). Each adder 108 may determine the full error magnitude, adding the error magnitude $d_1$ from its adder 106 to the $d_2$ error magnitude for the corresponding $U_2$ previously determined by HCHD 60 (i.e. may evaluate equation 18).

BCHD 62 may additionally comprise a counter-hypothesis generator 110 comprising, for each bit, a minimum evaluator 112 with an associated selector 114. Each minimum evaluator 112 may evaluate equation 19 by reviewing the error magnitudes d generated by adders 108 and by selecting the smallest error magnitude d. Each minimum evaluator 112 may then indicate to its selector 114 which counter-hypothesis to select.

It will be appreciated that the elements utilized by BCHD 62, like those of HCHD 60, are relatively simple elements. Each operation may be performed within one cycle of relatively short duration due to the simplicity of operations, and thus, the operations of HCHD 60 and BCHD 62 may be implemented in a pipelined manner. Because of this, and of the simple operations, very high throughput may be possible. Moreover, it will be appreciated that the throughput is fixed; no steps require determining if the calculation is finished. As a result, data may move through demapper 46 very smoothly, which may simplify the design of the controller needed to operate demapper 46.

Furthermore, it will be appreciated that the present invention is relatively insensitive to the errors often caused by using the $L_1$ norm rather than the $L_2$ norm, and as a result, benefits from substantial savings in implementation costs.

It will be appreciated that the 64-point QAM constellation used as example does not limit the applicability of the methods of the present invention to other constellations. Moreover, the present invention does not require 64 parallel computation paths. It is possible to implement 8, 4 and 2 computation paths for 64, 16 and 4 QAM constellations, respectively, and to reuse those paths 8, 4, and 2 times for each complete demapping operation. This way, the amount of operating logic and its operating frequency scales according to the constellation, which helps save battery power consumption.

Moreover, it will be appreciated that the number of processing branches scales with the constellation complexity. In FIGS. 9 and 10, there are 64 incoming branches for a 64 QAM constellation. A constellation of a different size will have different number of branches. Furthermore, the power consumption also scales according to constellation complexity which provides a significant efficiency.

Referring back to FIG. 6, demapper 47 may provide its output, the hypotheses and counter-hypotheses, to LLR determiner 48 which may, in turn, determine the log-likelihood ratio $L_b$ according to equation 4, repeated hereinbelow.

$$L_b = \frac{1}{\sigma^2}(2\hat{u}^{[b]} - 1)(\|x - R\hat{c}_b\|^2 - \|x - R\hat{u}\|^2) \qquad \text{Equation 4}$$

where x is the non-normalized received symbol vector and R is the non-normalized upper triangular matrix.

In accordance with an alternative embodiment of the present invention, the log-likelihood ratio $L_b$ may be evaluated more simply, using $L_1$ norms without significantly affecting performance, as follows:

$$L_b = \frac{r_1^2}{\sigma^2}(2\hat{u}^{[b]} - 1)\|\bar{x} - \bar{R}\hat{c}_b|^2 - |\bar{x} - \bar{R}\hat{u}|^2| \qquad \text{Equation 4a}$$

where $\bar{x}$ is the normalized received symbol vector and $\bar{R}$ is the normalized upper triangular matrix, normalized by $r_1$. More importantly, equation 4a may be evaluated using the error magnitudes previously calculated by demapper 46. Specifically (for bits $b=\beta=1\ldots 6$), $$d^{(m_{ML}^{(\beta)},\beta)} = |\bar{x} - \bar{R}\hat{c}_\beta| \qquad \text{Equation 21}$$

$$d^{(k_{ML})} = |\bar{x} - \bar{R}\hat{u}| \qquad \text{Equation 22}$$

And equation 4a becomes simplified and is evaluated based on previously computed values. Specifically, for bits $b=\beta=1\ldots 6$:

$$L_b = \frac{r_1^2}{\sigma^2}(2\hat{u}^{[b]} - 1)\left|d^{(m_{ML}^{(\beta)},\beta)} - d^{(k_{ML})}\right|\left(d^{(m_{ML}^{(\beta)},\beta)} + d^{(k_{ML})}\right) \qquad \text{Equation 4b}$$

And for bits $b=\beta+6=7\ldots 12$, $$L_b = \frac{r_1^2}{\sigma^2}(2\hat{u}^{[b]} - 1)\left|d^{(l_{ML}^{(\beta)})} - d^{(k_{ML})}\right|\left(d^{(l_{ML}^{(\beta)})} + d^{(k_{ML})}\right) \qquad \text{Equation 4c}$$

It will be appreciated that LLR determiner 48, like demapper 36, is relatively insensitive to the use of the $L_1$ norm. This insensitivity reduces the calculations to simple subtractions rather than multiplications which very significantly reduces the complexity of list-based MIMO processor 30.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

APPENDIX A

Lookup Tables

The table is the same for the real and the imaginary components. The bit position is within the component.

bit pos: Zero based bit position within the real or imaginary component;

hyp bit: hypothesis bit value at the bit position;

error sign: sign of the error $\overline{E}_1$;

c/hyp in: real or imaginary input counter-hypothesis value $U_1^{(m)}$; and c/hyp out: real or imaginary resultant counter-hypothesis value $U_1^{(m,\beta)}$

```
//=======================================================
// Table of Counter-Hypotheses for 16-QAM Constellation.
//=======================================================
//bit      hyp      error     c/hyp    c/hyp
//pos      bit      sign      in       out
// 0        0        -1       -3       -1
// 0        0        -1       -1       -1
// 0        0        -1       +1       +1
// 0        0        -1       +3       +1
// 0        0        +1       -3       -1
// 0        0        +1       -1       -1
// 0        0        +1       +1       +1
// 0        0        +1       +3       +1
// 0        1        -1       -3       -3
// 0        1        -1       -1       -3
// 0        1        -1       +1       +3
// 0        1        -1       +3       +3
// 0        1        +1       -3       -3
// 0        1        +1       -1       -3
// 0        1        +1       +1       +3
// 0        1        +1       +3       +3
// 1        0        -1       -3       +1
// 1        0        -1       -1       +1
// 1        0        -1       +1       +1
// 1        0        -1       +3       +3
// 1        0        +1       -3       +1
// 1        0        +1       -1       +1
// 1        0        +1       +1       +1
// 1        0        +1       +3       +3
// 1        1        -1       -3       -3
// 1        1        -1       -1       -1
// 1        1        -1       +1       -1
// 1        1        -1       +3       -1
// 1        1        +1       -3       -3
// 1        1        +1       -1       -1
// 1        1        +1       +1       -1
// 1        1        +1       +3       -1
```

```
//=======================================================
// Table of Counter-Hypotheses for BPSK/QPSK Constellation.
//=======================================================
//bit      hyp      error     c/hyp    c/hyp
//pos      bit      sign      in       out
// 0        0        -1       -1       +1
// 0        0        -1       +1       +1
// 0        0        +1       -1       +1
// 0        0        +1       +1       +1
// 0        1        -1       -1       -1
// 0        1        -1       +1       -1
// 0        1        +1       -1       -1
// 0        1        +1       +1       -1
```

```
//=======================================================
// Table of Counter-Hypotheses for 64-QAM Constellation.
//=======================================================
//bit      hyp      error     c/hyp    c/hyp
//pos      bit      sign      in       out
// 0        0        -1       -7       -5
// 0        0        -1       -5       -5
// 0        0        -1       -3       -3
// 0        0        -1       -1       -3
// 0        0        -1       +1       +3
// 0        0        -1       +3       +3
// 0        0        -1       +5       +5
// 0        0        -1       +7       +5
// 0        0        +1       -7       -5
// 0        0        +1       -5       -5
// 0        0        +1       -3       -3
// 0        0        +1       -1       -3
// 0        0        +1       +1       +3
// 0        0        +1       +3       +3
// 0        0        +1       +5       +5
// 0        0        +1       +7       +5
// 0        1        -1       -7       -7
// 0        1        -1       -5       -7
// 0        1        -1       -3       -1
// 0        1        -1       -1       -1
// 0        1        -1       +1       +1
// 0        1        -1       +3       +1
// 0        1        -1       +5       +7
// 0        1        -1       +7       +7
// 0        1        +1       -7       -7
// 0        1        +1       -5       -7
// 0        1        +1       -3       -1
// 0        1        +1       -1       -1
// 0        1        +1       +1       +1
// 0        1        +1       +3       +1
// 0        1        +1       +5       +7
// 0        1        +1       +7       +7
// 1        0        -1       -7       -3
// 1        0        -1       -5       -3
// 1        0        -1       -3       -3
// 1        0        -1       -1       -1
// 1        0        -1       +1       +1
// 1        0        -1       +3       +3
// 1        0        -1       +5       +3
// 1        0        -1       +7       +3
// 1        0        +1       -7       -3
// 1        0        +1       -5       -3
// 1        0        +1       -3       -3
// 1        0        +1       -1       -1
// 1        0        +1       +1       +1
// 1        0        +1       +3       +3
// 1        0        +1       +5       +3
// 1        0        +1       +7       +3
// 1        1        -1       -7       -7
// 1        1        -1       -5       -5
// 1        1        -1       -3       -5
// 1        1        -1       -1       -5
// 1        1        -1       +1       +5
// 1        1        -1       +3       +5
// 1        1        -1       +5       +5
// 1        1        -1       +7       +7
// 1        1        +1       -7       -7
// 1        1        +1       -5       -5
// 1        1        +1       -3       -5
// 1        1        +1       -1       -5
// 1        1        +1       +1       +5
// 1        1        +1       +3       +5
// 1        1        +1       +5       +5
// 1        1        +1       +7       +7
// 2        0        -1       -7       +1
// 2        0        -1       -5       +1
// 2        0        -1       -3       +1
// 2        0        -1       -1       +1
// 2        0        -1       +1       +1
// 2        0        -1       +3       +3
// 2        0        -1       +5       +5
// 2        0        -1       +7       +7
// 2        0        +1       -7       +1
// 2        0        +1       -5       +1
// 2        0        +1       -3       +1
// 2        0        +1       -1       +1
```

| //bit pos | hyp bit | error sign | c/hyp in | c/hyp out |
|---|---|---|---|---|
| // 2 | 0 | +1 | +1 | +1 |
| // 2 | 0 | +1 | +3 | +3 |
| // 2 | 0 | +1 | +5 | +5 |
| // 2 | 0 | +1 | +7 | +7 |
| // 2 | 1 | -1 | -7 | -7 |
| // 2 | 1 | -1 | -5 | -5 |
| // 2 | 1 | -1 | -3 | -3 |
| // 2 | 1 | -1 | -1 | -1 |
| // 2 | 1 | -1 | +1 | -1 |
| // 2 | 1 | -1 | +3 | -1 |
| // 2 | 1 | -1 | +5 | -1 |
| // 2 | 1 | -1 | +7 | -1 |
| // 2 | 1 | +1 | -7 | -7 |
| // 2 | 1 | +1 | -5 | -5 |
| // 2 | 1 | +1 | -3 | -3 |
| // 2 | 1 | +1 | -1 | -1 |
| // 2 | 1 | +1 | +1 | -1 |
| // 2 | 1 | +1 | +3 | -1 |
| // 2 | 1 | +1 | +5 | -1 |
| // 2 | 1 | +1 | +7 | -1 |

//=====================================================
// Table of Counter-Hypotheses for 256-QAM Constellation.
//=====================================================

| //bit pos | hyp bit | error sign | c/hyp in | c/hyp out |
|---|---|---|---|---|
| // 0 | 0 | -1 | -15 | -13 |
| // 0 | 0 | -1 | -13 | -13 |
| // 0 | 0 | -1 | -11 | -11 |
| // 0 | 0 | -1 | -9 | -11 |
| // 0 | 0 | -1 | -7 | -5 |
| // 0 | 0 | -1 | -5 | -5 |
| // 0 | 0 | -1 | -3 | -3 |
| // 0 | 0 | -1 | -1 | -3 |
| // 0 | 0 | -1 | +1 | +3 |
| // 0 | 0 | -1 | +3 | +3 |
| // 0 | 0 | -1 | +5 | +5 |
| // 0 | 0 | -1 | +7 | +5 |
| // 0 | 0 | -1 | +9 | +11 |
| // 0 | 0 | -1 | +11 | +11 |
| // 0 | 0 | -1 | +13 | +13 |
| // 0 | 0 | -1 | +15 | +13 |
| // 0 | 0 | +1 | -15 | -13 |
| // 0 | 0 | +1 | -13 | -13 |
| // 0 | 0 | +1 | -11 | -11 |
| // 0 | 0 | +1 | -9 | -11 |
| // 0 | 0 | +1 | -7 | -5 |
| // 0 | 0 | +1 | -5 | -5 |
| // 0 | 0 | +1 | -3 | -3 |
| // 0 | 0 | +1 | -1 | -3 |
| // 0 | 0 | +1 | +1 | +3 |
| // 0 | 0 | +1 | +3 | +3 |
| // 0 | 0 | +1 | +5 | +5 |
| // 0 | 0 | +1 | +7 | +5 |
| // 0 | 0 | +1 | +9 | +11 |
| // 0 | 0 | +1 | +11 | +11 |
| // 0 | 0 | +1 | +13 | +13 |
| // 0 | 0 | +1 | +15 | +13 |
| // 0 | 1 | -1 | -15 | -15 |
| // 0 | 1 | -1 | -13 | -15 |
| // 0 | 1 | -1 | -11 | -9 |
| // 0 | 1 | -1 | -9 | -9 |
| // 0 | 1 | -1 | -7 | -7 |
| // 0 | 1 | -1 | -5 | -7 |
| // 0 | 1 | -1 | -3 | -1 |
| // 0 | 1 | -1 | -1 | -1 |
| // 0 | 1 | -1 | +1 | +1 |
| // 0 | 1 | -1 | +3 | +1 |
| // 0 | 1 | -1 | +5 | +7 |
| // 0 | 1 | -1 | +7 | +7 |
| // 0 | 1 | -1 | +9 | +9 |
| // 0 | 1 | -1 | +11 | +9 |
| // 0 | 1 | -1 | +13 | +15 |
| // 0 | 1 | -1 | +15 | +15 |
| // 0 | 1 | +1 | -15 | -15 |
| // 0 | 1 | +1 | -13 | -15 |
| // 0 | 1 | +1 | -11 | -9 |
| // 0 | 1 | +1 | -9 | -9 |
| // 0 | 1 | +1 | -7 | -7 |
| // 0 | 1 | +1 | -5 | -7 |
| // 0 | 1 | +1 | -3 | -1 |
| // 0 | 1 | +1 | -1 | -1 |
| // 0 | 1 | +1 | +1 | +1 |
| // 0 | 1 | +1 | +3 | +1 |
| // 0 | 1 | +1 | +5 | +7 |
| // 0 | 1 | +1 | +7 | +7 |
| // 0 | 1 | +1 | +9 | +9 |
| // 0 | 1 | +1 | +11 | +9 |
| // 0 | 1 | +1 | +13 | +15 |
| // 0 | 1 | +1 | +15 | +15 |
| // 1 | 0 | -1 | -15 | -11 |
| // 1 | 0 | -1 | -13 | -11 |
| // 1 | 0 | -1 | -11 | -11 |
| // 1 | 0 | -1 | -9 | -9 |
| // 1 | 0 | -1 | -7 | -7 |
| // 1 | 0 | -1 | -5 | -5 |
| // 1 | 0 | -1 | -3 | -5 |
| // 1 | 0 | -1 | -1 | -5 |
| // 1 | 0 | -1 | +1 | +5 |
| // 1 | 0 | -1 | +3 | +5 |
| // 1 | 0 | -1 | +5 | +5 |
| // 1 | 0 | -1 | +7 | +7 |
| // 1 | 0 | -1 | +9 | +9 |
| // 1 | 0 | -1 | +11 | +11 |
| // 1 | 0 | -1 | +13 | +11 |
| // 1 | 0 | -1 | +15 | +11 |
| // 1 | 0 | +1 | -15 | -11 |
| // 1 | 0 | +1 | -13 | -11 |
| // 1 | 0 | +1 | -11 | -11 |
| // 1 | 0 | +1 | -9 | -9 |
| // 1 | 0 | +1 | -7 | -7 |
| // 1 | 0 | +1 | -5 | -5 |
| // 1 | 0 | +1 | -3 | -5 |
| // 1 | 0 | +1 | -1 | -5 |
| // 1 | 0 | +1 | +1 | +5 |
| // 1 | 0 | +1 | +3 | +5 |
| // 1 | 0 | +1 | +5 | +5 |
| // 1 | 0 | +1 | +7 | +7 |
| // 1 | 0 | +1 | +9 | +9 |
| // 1 | 0 | +1 | +11 | +11 |
| // 1 | 0 | +1 | +13 | +11 |
| // 1 | 0 | +1 | +15 | +11 |
| // 1 | 1 | -1 | -15 | -15 |
| // 1 | 1 | -1 | -13 | -13 |
| // 1 | 1 | -1 | -11 | -13 |
| // 1 | 1 | -1 | -9 | -13 |
| // 1 | 1 | -1 | -7 | -3 |
| // 1 | 1 | -1 | -5 | -3 |
| // 1 | 1 | -1 | -3 | -3 |
| // 1 | 1 | -1 | -1 | -1 |
| // 1 | 1 | -1 | +1 | +1 |
| // 1 | 1 | -1 | +3 | +3 |
| // 1 | 1 | -1 | +5 | +3 |
| // 1 | 1 | -1 | +7 | +3 |
| // 1 | 1 | -1 | +9 | +13 |
| // 1 | 1 | -1 | +11 | +13 |
| // 1 | 1 | -1 | +13 | +13 |
| // 1 | 1 | -1 | +15 | +15 |
| // 1 | 1 | +1 | -15 | -15 |
| // 1 | 1 | +1 | -13 | -13 |
| // 1 | 1 | +1 | -11 | -13 |
| // 1 | 1 | +1 | -9 | -13 |
| // 1 | 1 | +1 | -7 | -3 |
| // 1 | 1 | +1 | -5 | -3 |
| // 1 | 1 | +1 | -3 | -3 |
| // 1 | 1 | +1 | -1 | -1 |
| // 1 | 1 | +1 | +1 | +1 |
| // 1 | 1 | +1 | +3 | +3 |
| // 1 | 1 | +1 | +5 | +3 |
| // 1 | 1 | +1 | +7 | +3 |
| // 1 | 1 | +1 | +9 | +13 |
| // 1 | 1 | +1 | +11 | +13 |
| // 1 | 1 | +1 | +13 | +13 |
| // 1 | 1 | +1 | +15 | +15 |
| // 2 | 0 | -1 | -15 | -7 |

-continued

| | | | | |
|---|---|---|---|---|
| // 2 | 0 | -1 | -13 | -7 |
| // 2 | 0 | -1 | -11 | -7 |
| // 2 | 0 | -1 | -9 | -7 |
| // 2 | 0 | -1 | -7 | -7 |
| // 2 | 0 | -1 | -5 | -5 |
| // 2 | 0 | -1 | -3 | -3 |
| // 2 | 0 | -1 | -1 | -1 |
| // 2 | 0 | -1 | +1 | +1 |
| // 2 | 0 | -1 | +3 | +3 |
| // 2 | 0 | -1 | +5 | +5 |
| // 2 | 0 | -1 | +7 | +7 |
| // 2 | 0 | -1 | +9 | +7 |
| // 2 | 0 | -1 | +11 | +7 |
| // 2 | 0 | -1 | +13 | +7 |
| // 2 | 0 | -1 | +15 | +7 |
| // 2 | 0 | +1 | -15 | -7 |
| // 2 | 0 | +1 | -13 | -7 |
| // 2 | 0 | +1 | -11 | -7 |
| // 2 | 0 | +1 | -9 | -7 |
| // 2 | 0 | +1 | -7 | -7 |
| // 2 | 0 | +1 | -5 | -5 |
| // 2 | 0 | +1 | -3 | -3 |
| // 2 | 0 | +1 | -1 | -1 |
| // 2 | 0 | +1 | +1 | +1 |
| // 2 | 0 | +1 | +3 | +3 |
| // 2 | 0 | +1 | +5 | +5 |
| // 2 | 0 | +1 | +7 | +7 |
| // 2 | 0 | +1 | +9 | +7 |
| // 2 | 0 | +1 | +11 | +7 |
| // 2 | 0 | +1 | +13 | +7 |
| // 2 | 0 | +1 | +15 | +7 |
| // 2 | 1 | -1 | -15 | -15 |
| // 2 | 1 | -1 | -13 | -13 |
| // 2 | 1 | -1 | -11 | -11 |
| // 2 | 1 | -1 | -9 | -9 |
| // 2 | 1 | -1 | -7 | -9 |
| // 2 | 1 | -1 | -5 | -9 |
| // 2 | 1 | -1 | -3 | -9 |
| // 2 | 1 | -1 | -1 | -9 |
| // 2 | 1 | -1 | +1 | +9 |
| // 2 | 1 | -1 | +3 | +9 |
| // 2 | 1 | -1 | +5 | +9 |
| // 2 | 1 | -1 | +7 | +9 |
| // 2 | 1 | -1 | +9 | +9 |
| // 2 | 1 | -1 | +11 | +11 |
| // 2 | 1 | -1 | +13 | +13 |
| // 2 | 1 | -1 | +15 | +15 |
| // 2 | 1 | +1 | -15 | -15 |
| // 2 | 1 | +1 | -13 | -13 |
| // 2 | 1 | +1 | -11 | -11 |
| // 2 | 1 | +1 | -9 | -9 |
| // 2 | 1 | +1 | -7 | -9 |
| // 2 | 1 | +1 | -5 | -9 |
| // 2 | 1 | +1 | -3 | -9 |
| // 2 | 1 | +1 | -1 | -9 |
| // 2 | 1 | +1 | +1 | +9 |
| // 2 | 1 | +1 | +3 | +9 |
| // 2 | 1 | +1 | +5 | +9 |
| // 2 | 1 | +1 | +7 | +9 |
| // 2 | 1 | +1 | +9 | +9 |
| // 2 | 1 | +1 | +11 | +11 |
| // 2 | 1 | +1 | +13 | +13 |
| // 2 | 1 | +1 | +15 | +15 |
| // 3 | 0 | -1 | -15 | +1 |
| // 3 | 0 | -1 | -13 | +1 |
| // 3 | 0 | -1 | -11 | +1 |
| // 3 | 0 | -1 | -9 | +1 |
| // 3 | 0 | -1 | -7 | +1 |
| // 3 | 0 | -1 | -5 | +1 |
| // 3 | 0 | -1 | -3 | +1 |
| // 3 | 0 | -1 | -1 | +1 |
| // 3 | 0 | -1 | +1 | +1 |
| // 3 | 0 | -1 | +3 | +3 |
| // 3 | 0 | -1 | +5 | +5 |
| // 3 | 0 | -1 | +7 | +7 |
| // 3 | 0 | -1 | +9 | +9 |
| // 3 | 0 | -1 | +11 | +11 |
| // 3 | 0 | -1 | +13 | +13 |
| // 3 | 0 | -1 | +15 | +15 |
| // 3 | 0 | +1 | -15 | +1 |
| // 3 | 0 | +1 | -13 | +1 |
| // 3 | 0 | +1 | -11 | +1 |
| // 3 | 0 | +1 | -9 | +1 |
| // 3 | 0 | +1 | -7 | +1 |
| // 3 | 0 | +1 | -5 | +1 |
| // 3 | 0 | +1 | -3 | +1 |
| // 3 | 0 | +1 | -1 | +1 |
| // 3 | 0 | +1 | +1 | +1 |
| // 3 | 0 | +1 | +3 | +3 |
| // 3 | 0 | +1 | +5 | +5 |
| // 3 | 0 | +1 | +7 | +7 |
| // 3 | 0 | +1 | +9 | +9 |
| // 3 | 0 | +1 | +11 | +11 |
| // 3 | 0 | +1 | +13 | +13 |
| // 3 | 0 | +1 | +15 | +15 |
| // 3 | 1 | -1 | -15 | -15 |
| // 3 | 1 | -1 | -13 | -13 |
| // 3 | 1 | -1 | -11 | -11 |
| // 3 | 1 | -1 | -9 | -9 |
| // 3 | 1 | -1 | -7 | -7 |
| // 3 | 1 | -1 | -5 | -5 |
| // 3 | 1 | -1 | -3 | -3 |
| // 3 | 1 | -1 | -1 | -1 |
| // 3 | 1 | -1 | +1 | -1 |
| // 3 | 1 | -1 | +3 | -1 |
| // 3 | 1 | -1 | +5 | -1 |
| // 3 | 1 | -1 | +7 | -1 |
| // 3 | 1 | -1 | +9 | -1 |
| // 3 | 1 | -1 | +11 | -1 |
| // 3 | 1 | -1 | +13 | -1 |
| // 3 | 1 | -1 | +15 | -1 |
| // 3 | 1 | +1 | -15 | -15 |
| // 3 | 1 | +1 | -13 | -13 |
| // 3 | 1 | +1 | -11 | -11 |
| // 3 | 1 | +1 | -9 | -9 |
| // 3 | 1 | +1 | -7 | -7 |
| // 3 | 1 | +1 | -5 | -5 |
| // 3 | 1 | +1 | -3 | -3 |
| // 3 | 1 | +1 | -1 | -1 |
| // 3 | 1 | +1 | +1 | -1 |
| // 3 | 1 | +1 | +3 | -1 |
| // 3 | 1 | +1 | +5 | -1 |
| // 3 | 1 | +1 | +7 | -1 |
| // 3 | 1 | +1 | +9 | -1 |
| // 3 | 1 | +1 | +11 | -1 |
| // 3 | 1 | +1 | +13 | -1 |
| // 3 | 1 | +1 | +15 | -1 |

What is claimed is:

1. A demapper for a multiple-input, multiple-output symbol receiver, the demapper comprising:
a hypothesis determiner to determine hypotheses values for each of a multiplicity of received symbols; and
a first half counter-hypotheses determiner to reuse interim results of said hypothesis determiner to generate a first half of counter-hypotheses;
wherein said hypothesis determiner comprises:
a QR decomposer to generate at least an R matrix from an input channel estimate matrix H;
wherein the R matrix is an right triangular matrix that has a upper left element r1, an upper right element $R_{12}$ and a lower right element r2;
a normalizer to normalize input signals and elements of said R matrix;
a candidate hypothesis generator operating on the output of said normalizer to generate a plurality of constrained candidate hypothesis values for one of said received symbols and resultant unconstrained hypothesis values for a second one of said received symbols;
a normalized error calculator to operate with minimal multiplications and to generate an error magnitude for each of said plurality of constrained candidate hypotheses and their resultant unconstrained hypothesis values; and a hypothesis generator to review said error magnitudes and to select a constrained hypothesis and resultant unconstrained hypothesis corresponding to a smallest error magnitude.

2. The demapper according to claim 1 further comprising a second half counter-hypotheses determiner to receive a portion of said interim results and to provide them to a table lookup to generate a second half of said counter-hypotheses.

3. The demapper according to claim 1 wherein said first half counter-hypotheses determiner comprises:
a multiplicity of counter-hypothesis generators, one per bit of said selected hypothesis, each to review a set of said error magnitude associated with candidate counter-hypotheses and to select counter-hypothesis corresponding to the smallest error magnitude in said set of error magnitudes.

4. The demapper according to claim 1 wherein said normalized error calculator comprises:
a $d_2$ error magnitude calculator to evaluate an error $\overline{E}_2^{(k)} = \overline{X}_2 - \overline{r}_2 U_2^{(k)}$ and its corresponding $L_1$ norm wherein $\overline{r}_2$ is a normalized r2 element of matrix R, $\overline{X}_2$ is a normalized input signal and $U_2^{(k)}$ is a constellation point;
a $d_1$ error magnitude calculator to evaluate $\tilde{U}_1^{(k)} = \overline{X}_1 - \overline{R}_{12} U_2^{(k)}$, wherein $\overline{R}_{12}$ is a normalized $R_{12}$ element of matrix R, $\tilde{X}_1$ is a normalized input signal, to find a closest constellation point $U_1^{(k)}$ to an unconstrained solution $\tilde{U}_1^{(k)}$ and to determine an error $\overline{E}_1^{(k)}$ therebetween and its corresponding $L_1$ norm; and
a total error magnitude calculator to determine a total error magnitude from the output of $d_2$ error magnitude calculator and $d_1$ error magnitude calculator.

5. The demapper according to claim 4 wherein said $d_1$ error magnitude calculator and said $d_2$ error magnitude calculator comprise $L_1$ norm calculators.

6. The demapper according to claim 1 wherein said normalized error calculator comprises a multiplicity of processing branches, wherein a number of processing branches scales with a complexity of the constellation type related to said symbols.

7. The demapper according to claim 1 that is arranged to provide interim results of the first half counter-hypotheses determiner, of the second half counter-hypotheses determiner and of the hypotheses determiner to a log-likelihood ratio (LLR) determiner, wherein said LLR determiner utilizes said interim results to generate a log-likelihood ratio $L_b$.

8. A method, implementable on a multiple-input, multiple-output symbol receiver, the method comprising:
receiving or calculating a set of fixed constellation points;
selecting a hypothesis for a second symbol value $U_2$ from among the set of fixed constellation points;
calculating a hypothesis for a first symbol value $U_1$ from resultant selected $U_2$ value; and
generating a first half of counter-hypotheses from interim results of calculating said hypotheses values;
wherein the method comprising, prior to said calculating:
normalizing the following equations by an upper left element $r_1$ of matrix R thereby to enable the remaining operations to operate with minimal multiplications:

$$E_2 = X_2 - r_2 U_2$$

$$E_1 = X_1 - r_1 U_1 - R_{12} U_2$$

wherein R is a right triangular matrix that also comprises an upper right element $R_{12}$ and a lower right element r2; where R is generated by QR decomposition from an input channel estimate matrix H, $U_1$ and $U_2$ are transmitted symbols to be demapped and $X_1$ and $X_2$ are the received signals and $E_1$ and $E_2$ are errors.

9. The method according to claim 8 comprising providing a portion of said interim results to a table lookup to generate a second half of said counter-hypotheses.

10. The method according to claim 8 wherein said calculating comprises calculating errors and determining a size of said errors.

11. The method according to claim 8 comprising:
determining a log-likelihood ratio $L_b$ from said interim results of calculating said hypotheses values and from interim results of said table lookup operation.

* * * * *